Dec. 6, 1960 V. SIRAVO 2,963,260
BALL VALVE
Filed Dec. 9, 1958
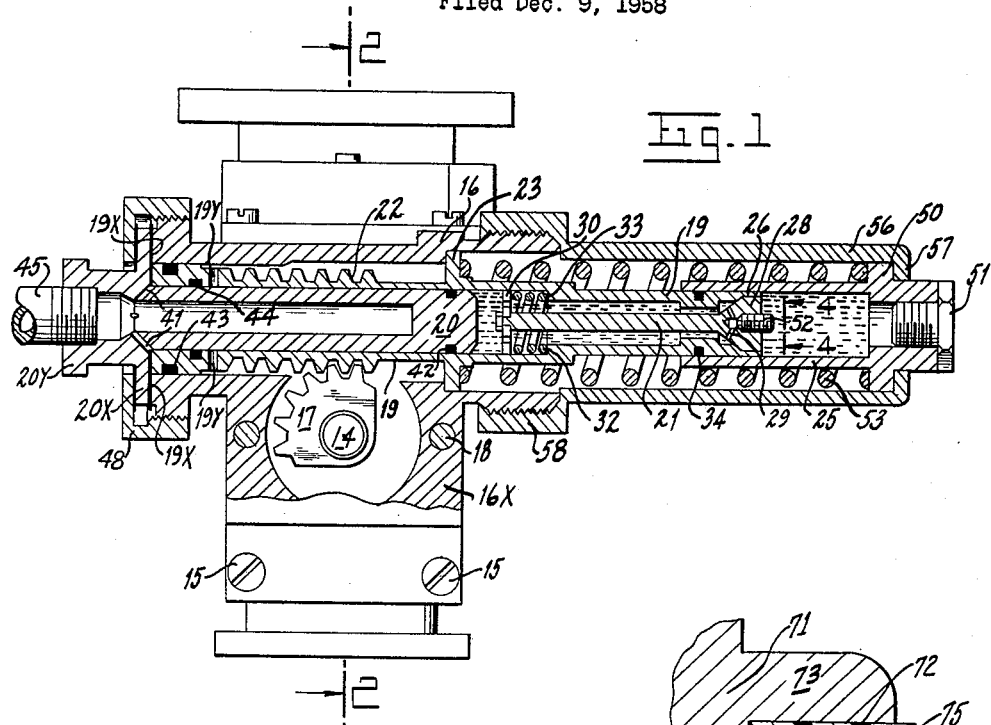
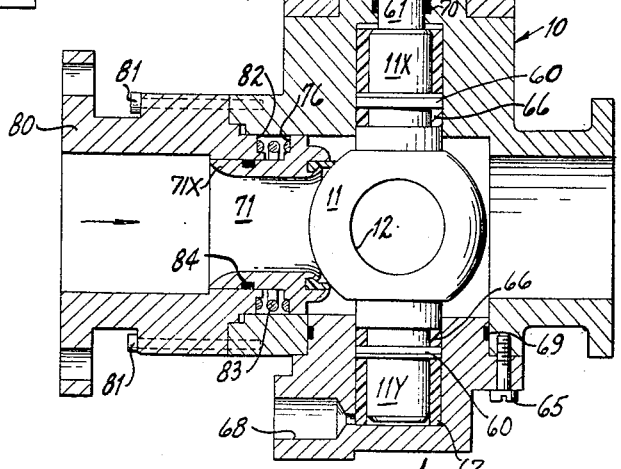
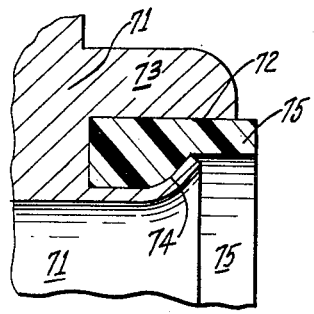
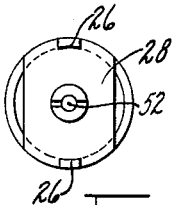
INVENTOR.
VINCENT SIRAVO
BY Frank Nakora
ATTORNEY United States Patent Office 2,963,260
Patented Dec. 6, 1960

2,963,260

BALL VALVE

Vincent Siravo, 139 Highland Parkway, Roselle, N.J.

Filed Dec. 9, 1958, Ser. No. 779,179

6 Claims. (Cl. 251—54)

This invention relates to a ball valve and more specifically to a ball valve having novel actuating means and novel seat means.

It is an object of this invention to provide a ball valve having actuating means for opening the valve with pre-selected speed.

It is another object to provide a valve having ring valve seat means for effecting a pre-selected sealing pressure against a ball valve.

It is another object to provide a fluid actuated valve of pre-selected slow opening and quick closing characteristics.

It is a further object to provide a ball valve having a self regulating captively held resilient sealing ring seat.

These and other objects of this invention will become apparent upon reading the following descriptive disclosure taken in conjunction with the accompanying drawing in which:

Fig. 1 is a top section view, broken away in part, showing a fluid actuated cylindrical rack and quadrant pinion and dash pot means for controlling the forward speed of said rack, Fig. 2 is a section view taken along line 2—2 of Fig. 1 and showing the resilient valve seat disposed against the ball valve and showing further the means connected to said quadrant pinion for turning the ball valve, Fig. 3 is an enlarged section view showing the manner of continuously captively retaining the resilient valve seat ring, and Fig. 4 is an end view of the dash pot showing the manner of adjusting the metering orifice by selection of set screws having holes of pre-determined diameter.

Turning to the drawing, a housing 10 is provided with a suitable chamber to receive a ball valve 11 having an aperture 12 therethrough. The housing 10 is provided with a top aperture through which the top stem 11X of the ball valve protrudes. The ball valve 11 is made integral with said top stem 11X and also with a bottom stem 11Y.

A holder 13 for a pinion shaft 14 is bolted to the housing 10 by conventional bolts 15. A rack housing 16 is provided with an integral lateral extension 16X having a cavity therein to receive the pinion 17. The rack housing 16 is bolted to holder 13 by a pair of opposed bolts 18.

The cylindrical piston rack 19 is a long tubular element adapted at one end to receive a flanged cavity containing finger plug 20 in the tube of the rack so that the rack slides on the plug 20, and adapted at the other end to receive a rod-like dash-pot 21 for cushioning the oil flow in the free chamber within the tube of rack 19 disposed at the end of finger plug 20.

As shown in Figs. 1 and 2, the rack housing 16 is threaded at both ends and is provided with a cylindrical dual diameter hole, a smaller diameter hole to receive the integral cylindrical teeth 22 of rack 19 and a larger diameter hole to receive the integral centrally located stop flange 23 of rack 19. The flange 23 on the piston rack moves with the other integral rack elements under fluid actuation and is returned by spring means upon release of fluid actuation pressure to seat against the abutment formed between the dual holes of the housing 16 (Fig. 1). Fig. 1 thus shows the rack in its normal or non-actuated position.

The rack 19 is provided with a small end disposed away from the rack teeth 22, said end being an integral tube of relatively small exterior diameter disposed slideably in a suitable borehole chamber in a cylindrical oil holder 25. The edge of the small diameter end of rack 19 is provided with a pair of opposed extension locking studs 26 for preventing rotation of the dash pot rod 28 connected thereto by a pair of mating co-acting grooves disposed in the pot head 28 (Fig. 4).

As shown in the drawing, the pot head 28 is provided with a threaded borehole leading to one or more lateral conduits 29, leading into the tubular chamber of the piston rack 19.

The dash pot head 28 is provided with a conical base and is seated on a conical surface disposed in the tube of the small end of rack 19. The dash pot rod 21 is threaded at its inner end and extends into the rack 19. A disc 30 having a central aperture and a plurality of radial apertures is disposed through its central aperture on the threaded end of dash pot rod 21 and secured thereto by a conventional nut. A dash pot spring 32 is disposed against the disc 30 and against a suitable annular abutment 33 within the bore of rack 19. The rack 19 is provided with a suitable groove and with a resilient O-ring 34 to effect a fluid tight seal between the rack 19 and the oil holder 25.

Turning now to the end of rack 19 disposed away from the dash pot rod 21, the finger plug 20 is provided with an integral flange 20X. A plurality of holes 41 are disposed through plug 20 where the flange 20X meets the finger portion of the plug 20.

A groove is provided in plug 20 near its finger end and an O-ring 42 is disposed therein to effect a fluid tight seal. Similarly a pair of spaced-apart grooves are provided adjacent the front end of rack 19 and sealing O-rings 43 and 44 are disposed therein to make a fluid tight seal between the rack housing 16 and the rack 19 and also between rack 19 and plug 20 respectively. Plug 20 is also provided with an integral tubular extension 20Y, threaded internally to receive a pipe 45 having fluid therein and secured to a pressure producing device, for example, a pump.

The finger flange 20X is secured to the rack housing 16 by a conventional moveable screw cap 48. Preferably a suitable sealer washer 19X of plastic material or suitably applied by brush is disposed on each side of flange 20X but away from holes 41, to effect a fluid tight condition.

Returning now to the dash pot end of the rack, the cylindrical tubular oil holder 25 is provided with a flange 50. The extreme end of the tube of the holder 25 is provided with threads and a threaded plug 51 is disposed therein in a fluid tight relationship. A set screw 52 having a borehole therethrough is disposed in the threaded borehole of the dash pot head 28. A plurality of set screws 52 of varying diameter boreholes are provided and are interchangeably screwed into the dash pot head 28 by first removing the oil holder plug 51.

A rack return coil spring 53 is disposed around rack 19 and oil holder 25 between and against the rack flange 23 and the oil holder flange 50. A tubular oil holder retainer 56 is provided at one end with an inwardly disposed flange 57 to engage the exterior wall of the oil holder flange 50. The retainer 56 is provided at its other end with a cap 58 having interior threads for threaded engagement with the rack housing 16.

In operation oil under suitable pressure is pumped through pipe 45 into the cavity of said cavitated plug 20 and then through holes 41 against the front edge 19X of piston rack 19 causing the rack 19 to move to the right (Fig. 1). This movement of rack 19 causes it to slide on the finger portion of element 20 compressing spring 53 and simultaneously forcing oil from the oil filled chamber of the oil holder 25 through the apertured set screw 52 and conduits 29 into the tubular chamber portion of the rack 19 and thence through the radial apertures of disc 30 in the increasing chamber formed between the end of the finger 20 and the disc 30.

Clearly the movement of the rack 19 under oil actuation pressure is slow and is dependent upon the borehole size in the set screw 52. As the rack 19 moves to the right it slowly revolves the pinion 17 meshed to the rack teeth 22 thereby slowly turning the fixed pinion shaft 14 disposed at a right angle to the pinion plate and its teeth. Pinion shaft 14 is coupled to the ball stem 11X of the ball valve as will be described hereinafter. Upon release of the pressure on the fluid in pipe 45 the spring 53 rapidly forces the piston rack to its starting position (Fig. 1) since the dash pot head 28 is unseated by pressure acting on the disc 30 and against the small spring 32 compressing the latter spring 32 to permit the displaced oil to return into the oil holder 25. Rack 19 is provided optionally with vent holes 19Y if desired.

Turning now to Fig. 2, a ball valve is provided with integral top and bottom stems 11X and 11Y respectively. Each stem is provided with a flange 60. The top stem 11X is provided an integral extension stud 61 having an integral diametrical rectangular bar 62 thereon. The pinion shaft 14 may be provided with a groove to receive bar 62, but preferably a separate removable coupling 63 is employed to allow for misalignment of shaft 14 and valve stem 11X.

Thus coupling 63 is cylindrical and is provided with a groove on its top wall to receive a depending co-acting integral key located on the bottom of shaft 14. Coupling 63 is also provided on its bottom wall with a suitable groove to receive bar 62.

The top valve stem 11X is disposed in a suitable aperture of the housing 10 and the bottom stem 11Y is disposed in a cavitated removable valve holder 64 secured by bolts 65 to the housing 10. An annular ring 66 is disposed against respective flanges 60 in a suitable groove in both the top and bottom stems to seal the ball 11 from the plastic bearings in a fluid tight manner. A plastic tubular bearing 67 is disposed against the other side of the respective flanges 60 around the respective stems.

A safety vent hole 68 is provided in the cylindrical valve holder 64 and another O-ring 69 is disposed in holder 64 to effect a fluid tight seat between the holder and the housing 10. Similarly housing 10 is provided with a groove and another O-ring 70 is disposed therein to make a fluid tight seal between the stem extension 61 and housing 10.

An important feature of this invention is the provision of a self regulating spring loaded valve seat to effect a substantially leak proof seal to fluids between the valve seat and the ball 11.

To make this valve seat a cylindrical movable tubular slide 71 is provided with an annular rectangular lip channel 72 having an exterior rigid backing wall 73 and a deformable or turnable inner wall 74 capable of being bent over by conventional metal turning or metal spinning devices.

A suitable resilient sealer ring 75 of rectangular cross-section, made for example, of plastic material such as Teflon, is press fitted into groove 72 so as to suitably protrude beyond wall 73. Then the thin wall 74 is turned so as to clamp the ring 75 annularly about 360 degrees (Fig. 3).

As shown in Fig. 2, the slide element 71 is provided with a circular flange 76. An inlet support 80 is bolted to housing 10 by bolts 81. Support 80 is provided with a bore to slidingly receive the slide 71 and with an abutment 82 disposed in opposed relationship to flange 76 of the slide 71. A suitably strong spring 83 is disposed between flange 76 and abutment 82 so that the slide 71 is continuously urged against the ball 11 with the sealer ring 75 engaging the ball tangentially at one of its corners.

Slide 71 is provided with a suitable groove and an O-ring 84 is disposed therein to effect a fluid tight seal between slide 71 and support 80.

In operation the valve seat 75 is pressed against the ball 11 by spring 83 and also by the fluid pressure of the fluid in the element 80 acting on the rear or curved wall 71X of the slide 71.

Thus if the effective pressure on the wall 71X of slide 71 is 15 pounds and the spring pressure of spring 83 is 25 pounds, the over-all pressure of the ring seat 75 on the ball 11 is 40 pounds.

Clearly as the fluid pressure of the fluid incoming in inlet element 80 is increased, this increase is exerted against wall 71X so that the seating force of the seating ring 75 against ball 11 increases as the pressure of the incoming fluid increases. Thus the valve seat pressure of ring 75 is automatically adjusted by the pressure of the incoming fluid. Where a desired pressure is to be maintained by seat 75 on ball 11 this is in part regulated by interchangeable use of a variety of springs 83 of various tension.

By effective pressure is meant the difference between the total pressure on wall 71X less the back pressure exerted by the fluid on the turned over clamping wall retaining the ring seat 75.

This valve seat is excellent for temperature of minus 60° F. to plus 165° F. as the clamping force is not loosened by these temperatures.

The valve seat 75 also effects a fluid tight seat and functions therefore like an O-ring.

This valve can be adjusted to obtain a predetermined resistance to overcome a pre-determined torque of the ball. Thus where the maximum allowable turning force is for example, 10 pounds a suitable spring 83 co-acting with a suitable operating slide surface 71X is employed.

Moreover, since the valve seat 75 is rigidly clamped so as to expose a right angle corner contact with the ball 11, it is not displaced or popped into the ball aperture 13 so that there is little wear and tear on the seat 75 giving it a long operating life. Such a captively held seat also functions so as to clean or wipe the ball 11 as it is revolved.

This invention is of generic scope so it is not to be limited to the illustrative embodiment herein.

I claim:

1. A fluid actuated mechanism for slowly turning a rotary valve stem comprising a cylindrical integral tubular piston rack having at one end a plurality of circular spaced-apart rack teeth of relatively large diameter and adapted at the other relatively small diameter end to receive and seat a conical dash pot head, a dash pot having a conical valve head having an aperture therethrough having a dash pot rod integral with the cone base disposed movably in said smaller end of said rack, apertured disc means secured to the end of said dash pot rod, a coil spring disposed against said disc means and an abutment in the tube of said rack continuously urging the dash pot valve head into seated engagement with said rack, a longitudinal cavity containing finger plug having a flange intermediate the ends thereof disposed in the tube of said rack in fluid tight relationship at the rack teeth end, said finger plug having at least one angled aperture passing therethrough adjacent the base of its flange and communicating with the cavity, said flange of said plug being normally disposed against said rack, a housing having a tubular aperture having said rack therein and having a lateral integral portion having a cavity communicating with the tubular aperture, a pinion plate disposed in the cavity of said housing and engaging the rack teeth, a valve shaft secured at a right angle to said pinion plate, a tubular fluid holder disposed about said rack smaller end in fluid tight sliding relationship, a coil rack return spring disposed in part about said rack and biased against a rack abutment and said fluid holder for continuously urging said rack against said finger flange of said plug, means for securing said plug to said housing in a fluid tight manner, and means for securing said rack return spring to said housing whereby fluid under pressure in the cavity of said plug is forced through said angle aperture against said piston rack causing it to move into the fluid holder and against the rack return spring thereby causing fluid to be forced slowly through the dash pot head and the dash pot disc into the tubular rack chamber located between plug and said disc.

2. The combination of a ball valve having a valve stem and housing and hydraulic means for actuating said valve, said hydraulic means comprising a longitudinal piston having a central borehole; a plurality of suitable rack teeth suitably located upon and integral with said piston; a movable plug disposed in one end of said central borehole adjacent said rack teeth and movable with respect to said teeth; dash pot means movably disposed in the other end of said central borehole and separated from said plug by a column of hydraulic fluid; a coil spring disposed against and around said piston adjacent said dash pot means; a rotatable pinion secured to said valve stem and engaging said rack teeth; enclosure means having an opening for operating fluid and enclosing said piston, said opening being disposed adjacent said plug for simultaneously actuating automatically said plug and said piston and said dash pot means, said coil spring being biased interiorly against said enclosure means for continuously urging said piston into closed position.

3. The combination of claim 2 wherein said enclosure means comprise a stationary tubular oil holder disposed upon said tubular piston adjacent the dash pot retaining end; sealing means disposed around said piston within said oil holder for slidingly moving said piston into said oil holder in fluid tight relationship; dash pot means having dash pot valve means disposed within and against said piston end in said oil holder and adjustable threaded means disposed in an aperture of said dash pot valve means for selectively regulating the flow of oil from said oil holder into said piston central borehole.

4. The combination of claim 3 wherein said dash pot means comprise said dash pot valve means, said adjustable threaded means; a rod integral with said dash pot valve means and disposed in said central borehole of said piston and axial to said coil spring disposed around said piston; an apertured disc secured to the end of said rod, said disc being in space relationship to the end of said plug in said piston; and a second coil spring disposed against said disc and around said dash pot rod and biased in said central borehole against said piston for continuously urging said dash pot valve means into closed position.

5. The combination of claim 4 wherein said oil holder is provided with a threaded aperture, and threaded means for sealingly securing said threaded aperture in a fluid tight manner whereby said adjustable threaded means in said dash pot valve means may be adjusted through said threaded aperture of said oil holder.

6. The combination of claim 4 wherein said enclosure means includes a threaded portion of said ball valve housing and a sleeve threaded interiorly at one end engaging said threaded portion of said housing, said sleeve being flanged inwardly at its non-threaded end engaging said oil holder whereby said oil holder is biased against said coil spring disposed exteriorly around said piston.

References Cited in the file of this patent
UNITED STATES PATENTS

| | | |
|---|---|---|
| 1,171,085 | Beck | Feb. 8, 1916 |
| 2,243,405 | Wine | May 27, 1941 |
| 2,695,153 | Gillaspy | Nov. 23, 1954 |
| 2,783,743 | Pappas | Mar. 5, 1957 |
| 2,800,295 | Thomas | July 23, 1957 |
| 2,848,186 | Bayer | Aug. 19, 1958 |